(12) United States Patent
Han et al.

(10) Patent No.: US 7,592,730 B2
(45) Date of Patent: Sep. 22, 2009

(54) HYBRID INDUCTION MOTOR

(75) Inventors: Seung-Do Han, Hwaseong (KR);
Seung-Suk Oh, Gwangmyeong (KR);
Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 374 days.

(21) Appl. No.: 11/612,871

(22) Filed: Dec. 19, 2006

(65) Prior Publication Data
US 2007/0216248 A1 Sep. 20, 2007

(30) Foreign Application Priority Data
Mar. 17, 2006 (KR) .................. 10-2006-0025001

(51) Int. Cl.
*H02K 17/26* (2006.01)
*H02K 16/02* (2006.01)
(52) U.S. Cl. .............. 310/166; 310/114; 310/156.25; 310/266; 310/112
(58) Field of Classification Search ............ 310/114, 310/126, 156.25, 166, 266; *H02K 17/26, H02K 16/02, 17/02*
See application file for complete search history.

(56) References Cited
U.S. PATENT DOCUMENTS

| | | | | |
|---|---|---|---|---|
| 1,227,185 A * | 5/1917 | Neuland | ..................... | 310/105 |
| 2,864,017 A * | 12/1958 | Waltscheff | ................. | 310/126 |
| 3,614,494 A * | 10/1971 | Borchers et al. | ............... | 310/56 |
| 5,675,203 A * | 10/1997 | Schulze et al. | ............... | 310/113 |
| 6,297,575 B1 * | 10/2001 | Yang | .......................... | 310/266 |
| 6,380,653 B1 * | 4/2002 | Seguchi | ..................... | 310/112 |
| 6,700,272 B1 * | 3/2004 | Lindner | ..................... | 310/166 |
| 6,794,781 B2 * | 9/2004 | Razzell et al. | ............... | 310/114 |
| 2006/0131984 A1 | 6/2006 | Han et al. | | |
| 2006/0208597 A1 | 9/2006 | Lee et al. | | |
| 2006/0226722 A1 | 10/2006 | Kim et al. | | |
| 2006/0284505 A1 | 12/2006 | Han et al. | | |
| 2006/0284509 A1 | 12/2006 | Han et al. | | |

OTHER PUBLICATIONS

U.S. Appl. No. 11/616,113 to Oh et al., which was filed on Dec. 26, 2006.

* cited by examiner

*Primary Examiner*—Burton Mullins
(74) *Attorney, Agent, or Firm*—Ked & Associates LLP

(57) ABSTRACT

A hybrid induction motor includes a motor casing; a rotational shaft rotatably coupled with the motor casing; an induction rotor rotated by being integrally coupled with the rotational shaft and having a rotor core and a conductor bar inserted in the rotor core; a stator having a hollow into which the induction rotor is inserted and installed with a certain length in a direction of the rotational shaft; a first magnetic rotor inserted between the stator and the induction rotor and coupled with the rotational shaft so as to be freely rotatable; a second magnetic rotor inserted between the stator and the induction rotor so as to be symmetrical with the first magnetic rotor and coupled with the rotational shaft so as to be freely rotatable; and a magnetic spacer inserted between the first and second magnetic rotors.

7 Claims, 6 Drawing Sheets

HYBRID INDUCTION MOTOR

RELATED APPLICATION

The present disclosure relates to subject matter contained in priority Korean Application No. 10-2006-0025001, filed on Mar. 17, 2006, which is herein expressly incorporated by reference in its entirety.

BACKGROUND OF THE INVENTION

1. Field of the Invention

The present invention relates to a hybrid induction motor having first and second magnetic rotors for improving a variable speed and driving characteristics, and more particularly, to a hybrid induction motor capable of reducing vibration and noise generated when the first and second magnetic rotors contact and as separated with each other as a motor is driven or is failed.

2. Description of the Related Art

FIG. 1 is a vertical sectional view of a hybrid induction motor studied and developed by the applicant of the present invention, FIG. 2 is a cross-sectional view showing the hybrid induction motor showing a state that the first and second magnetic rotors of FIG. 1 are combined while driven, and FIG. 3 is a cross-sectional view of the hybrid induction motor showing a state that the first and second magnetic rotors are separated while driven.

With reference to FIGS. 1 and 2, the hybrid induction motor studied and developed by the applicant of the present invention includes a motor casing 10; a rotational shaft 11 rotatably coupled with the motor casing 10; an induction rotor 20 having a rotor core 21 integrally coupled with the rotational shaft 11 and rotated and a conductor bar 22 inserted into the rotor core 21; a stator 70 having a hollow 70a to allow the induction rotor 20 to be inserted therein and having a certain length in a direction of the rotational shaft 11; a first magnetic rotor 40 inserted between the stator 70 and the rotor core 21 and coupled with the rotational shaft 11 so as to be freely rotatable; and a second magnetic rotor 40 inserted between the stator 70 and the induction rotor 20 in a symmetrical manner with the first magnetic rotor 40, and coupled with the rotational shaft 11 so as to be freely rotatable.

The motor casing 10 is a container with an opening and a cover 10a for covering the opening is coupled with the motor casing. A mounting recess 10b where a bearing 12 that rotatably supports the rotational shaft 11 is installed is formed at the cover 10a.

The induction rotor 20 includes the rotor core 21 formed in an annular shape with a certain length and the conductor bar 22 inserted into the rotor core 21.

The rotor core 21 is a stacked body formed with a plurality of sheets stacked, and the rotational shaft 11 is fixed combined at the middle portion of the rotor core 21. Accordingly, when the rotational shaft 11 is rotated, the induction rotor 20 is also integrally rotated.

The stator 70 includes a stator core 71 formed with a certain length and a winding coil 72 having a main winding and a sub-winding wound in a circumferential direction within the stator core 71.

The stator core 71 is a stacked body formed by stacking a plurality of sheets and includes a yoke part 71a formed in an annular shape with a certain width and a plurality of teeth 71b extending with a certain length on an inner circumferential surface of the yoke part 71a. A slot 73 is formed between the teeth 71a and a hollow 70a in which the induction rotor 20 is inserted is formed within the stator core 71 by an end face of the teeth 71b.

The winding coil 72 is wound on the teeth 71b several times and positioned in the slot 73 formed by the teeth 71b. When AC power is applied to the main winding and the sub-winding at an initial stage of driving, a rotating magnetic field is generated. At this time, an induction current flows to the conductor bar 22 of the induction rotor 20, and the induction rotor 20 starts to be rotated. Herein, the stator 70 is rotated by being slipped, and at this time, the current flowing at the sub-winding is blocked by a current blocking unit and current flows only at the main winding.

The first magnetic rotor 40 includes a first magnet in a cylindrical shape with a certain thickness and a first holder 42 formed in a cup shape and supporting the first magnet 41. The first magnet 41 is rotatably inserted between an inner circumferential surface of the first stator 70 and an outer circumferential surface of the induction rotor 20. A first bearing recess 42a in which the first bearing 42 is coupled is formed at one side of the first holder 42. As the rotational shaft 11 is coupled at the first bearing 43, the first holder 42 can be freely rotated on the rotational shaft 11.

The second magnetic rotor 50 includes a second magnet 51 installed spaced apart by a certain interval from the first magnet 41 and having a cylindrical shape with a certain thickness, and a second holder 52 formed in a cup shape and supporting the second magnet 51. The second magnet 51 is rotatably inserted between an inner circumferential surface of the second stator 80 and an outer circumferential surface of the inductor rotor 20. A second bearing recess 52a in which the second gearing 53 is coupled is formed at one side of the second holder 52. As the rotational shaft 11 is coupled with the second bearing 53, the second holder 53 can freely rotate on the rotational shaft 11.

The operation of the hybrid induction motor will now be described with reference to FIGS. 2 and 3.

When power is applied to the winding coil 72 of the stator 70, a rotating magnetic field is formed. The thusly formed rotating magnetic field makes the first and second magnetic rotors 40 and 50 rotate at a synchronous speed.

With reference to FIG. 2, when the S pole of the first magnet 41 and the N pole of the second magnet 51 are positioned at a position as shown in FIG. 2 while the motor is being driven, the S pole of the first magnet 41 and the N pole of the second magnet 51 attract each other. Then, the first magnetic rotor 40 moves in the direction of an arrow 'A'0 and the second magnetic rotor 50 moves in a direction of an arrow 'B', allowing the first and second magnets 41 and 51 to be attached with each other, and in this case, vibration and noise are generated.

With reference to FIG. 3, when the S pole of the first magnet 41 and the S pole of the second magnet 51 are positioned at a position as shown in FIG. 3 while the motor is being driven, the S pole of the first magnet 41 and the S pole of the second magnet 51 repulses each other. Then, the first magnetic rotor 40 moves in a direction of an arrow 'C'0 and the second magnetic rotor 50 moves in a direction of an arrow 'D', so as to be separated. At this time, while they are separated, vibration and noise are generated.

As a result, while the motor is being driven, the fist and second magnetic rotors 40 and 50 are continuously attached and separated to generate vibration and noise, causing a problem that the operational reliability of the hybrid induction motor is degraded.

In addition, the same problem also arises when the motor is broken down as well as when the motor is driven. Namely, when a power supply to the stator 70 is suddenly stopped because of a failure of the motor, the first and second magnets 41 and 51 are attached or separated according to mutual positions therebetween, generating vibration and noise. Thus, the operational reliability of the hybrid induction motor is also degraded.

BRIEF DESCRIPTION OF THE INVENTION

Therefore, an object of the present invention is to provide a hybrid induction motor having first and second magnetic rotors for improving a variable speed and driving characteristics, capable of reducing vibration and noise generated when the first and second magnetic rotors are driven or failed.

To achieve these and other advantages and in accordance with the purpose of the present invention, as embodied and broadly described herein, there is provided a hybrid induction motor including: a motor casing; a rotational shaft rotatably coupled with the motor casing; an induction rotor rotated by being integrally coupled with the rotational shaft and having a rotor core and a conductor bar inserted in the rotor core; a stator having a hollow into which the induction rotor is inserted and installed with a certain length in a direction of the rotational shaft; a first magnetic rotor inserted between the stator and the induction rotor and coupled with the rotational shaft so as to be freely rotatable; a second magnetic rotor inserted between the stator and the induction rotor so as to be symmetrical with the first magnetic rotor and coupled with the rotational shaft so as to be freely rotatable; and a magnetic spacer inserted between the first and second magnetic rotors.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The hybrid induction motor according to the exemplary embodiment of the present invention will be described with reference to the accompanying drawings.

Figure 4:
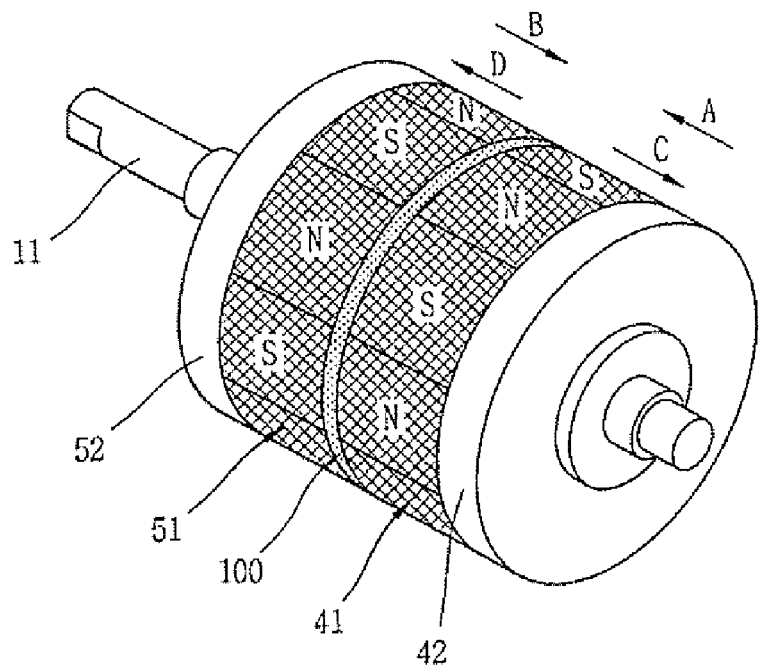
FIG. 4 is an assembled perspective view of the first and second magnetic rotors, a magnetic spacer and a rotational shaft of the hybrid induction motor according to an exemplary embodiment of the present invention.
Figure 5:
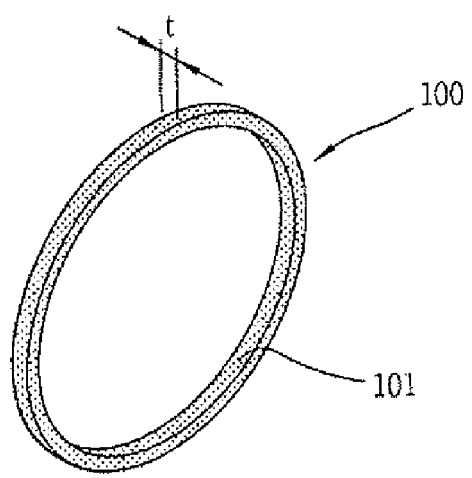
FIG. 5 is a perspective view of the magnetic spacer of FIG. 4.
Figure 6:
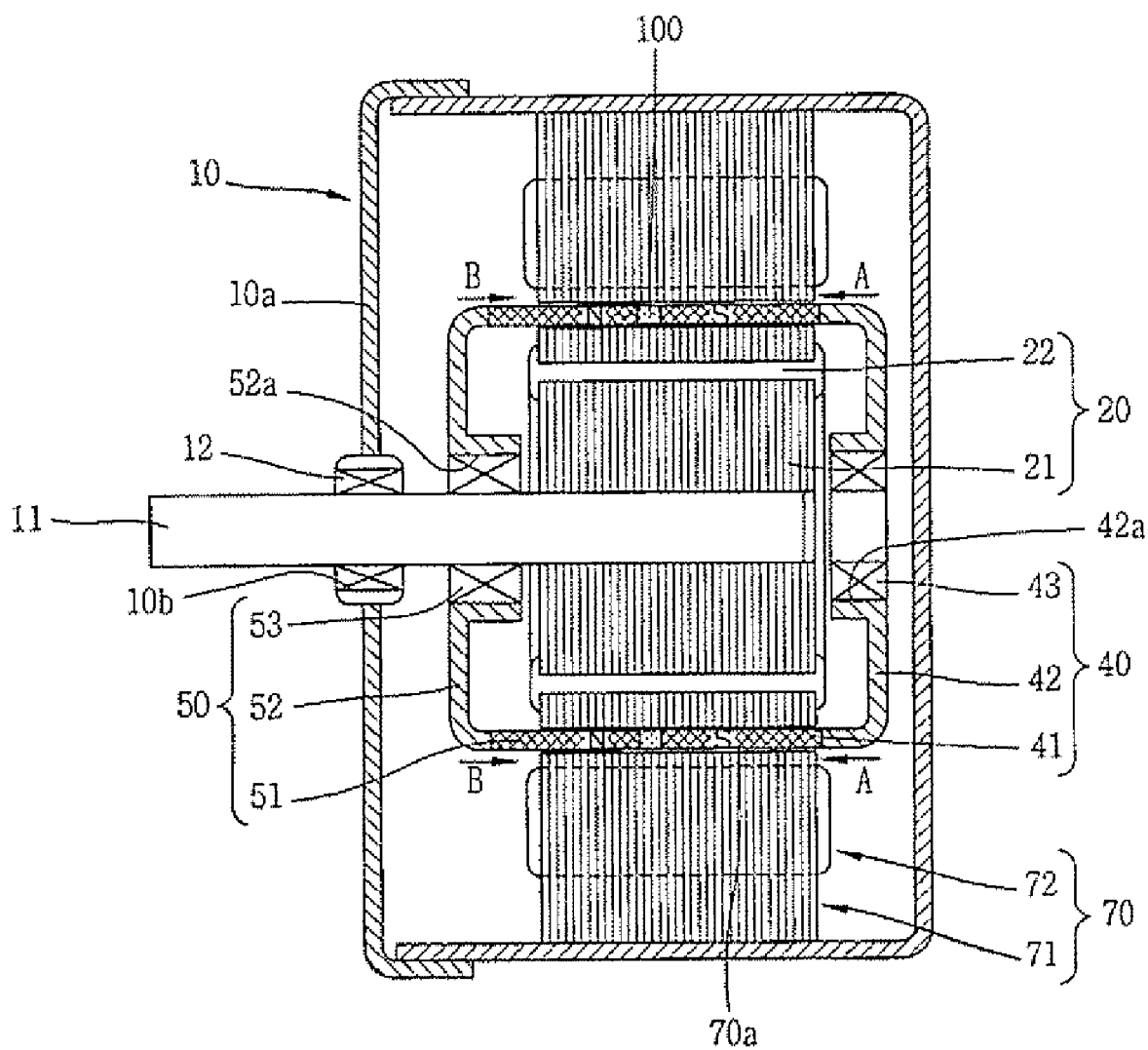
FIG. 6 is a cross-sectional view of the hybrid induction motor showing a state that the first and second magnetic rotors of FIG. 4 are attached to the magnetic spacer during their operation.
Figure 7:
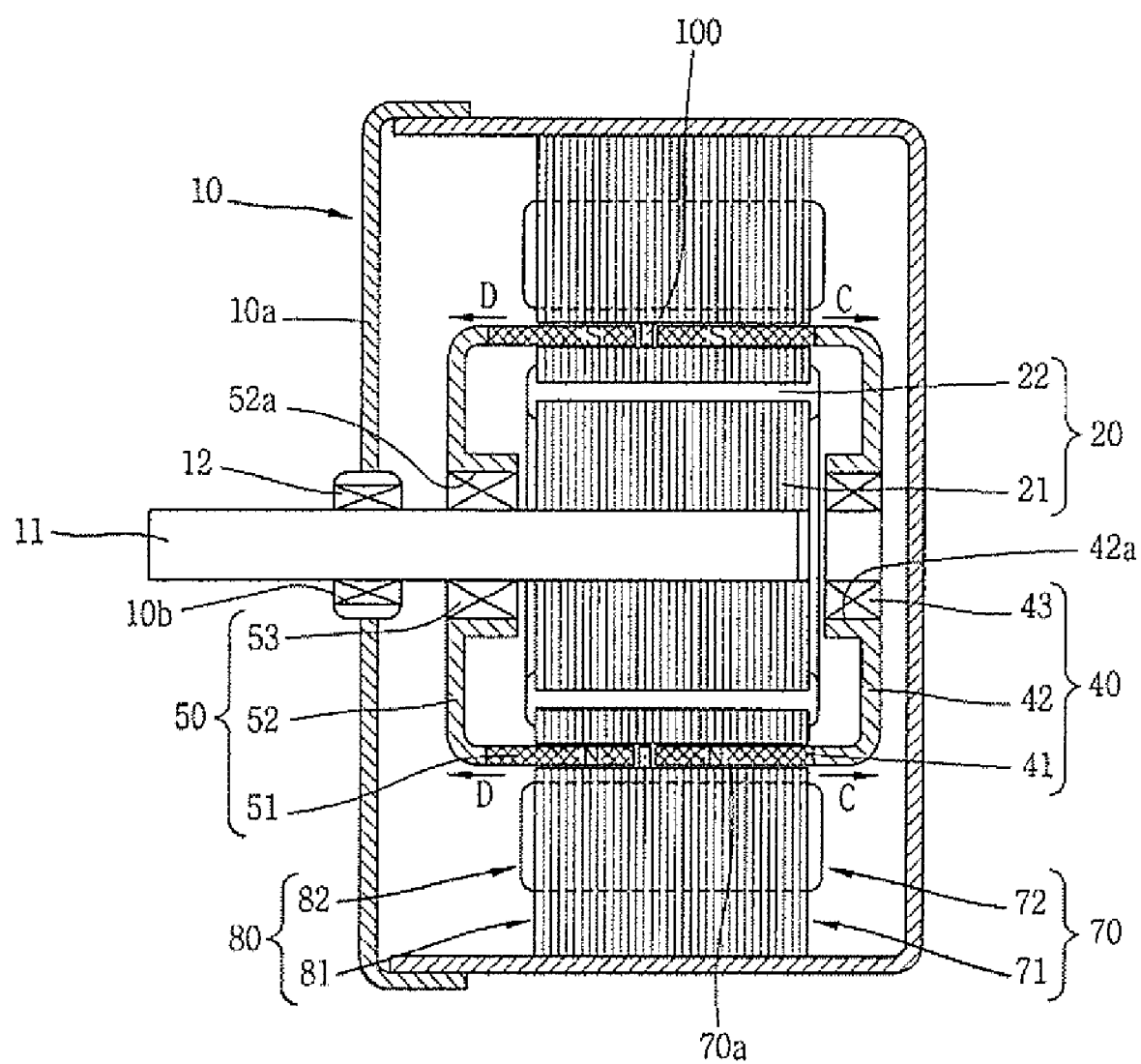
FIG. 7 is a cross-sectional view of the hybrid induction motor showing a state that the first and second magnetic rotors of FIG. 4 are separated from the magnetic spacer during their operation.

FIG. 4 is an assembled perspective view of the first and second magnetic rotors, a magnetic spacer and a rotational shaft of the hybrid induction motor according to an exemplary embodiment of the present invention, FIG. 5 is a perspective view of the magnetic spacer of FIG. 4, FIG. 6 is a cross-sectional view of the hybrid induction motor showing a state that the first and second magnetic rotors of FIG. 4 are attached to the magnetic spacer during their operation, and FIG. 7 is a cross-sectional view of the hybrid induction motor showing a state that the first and second magnetic rotors of FIG. 4 are separated from the magnetic spacer during their operation. The same or equivalent elements as those in the related art will be given the same reference numerals and a description for those same elements will be omitted.

With reference to FIGS. 4 and 6, a hybrid induction motor includes: a motor casing 10; a rotational shaft 11 rotatably coupled with the motor casing 10; an induction rotor 20 having a rotor core 21 integrally coupled with the rotational shaft and rotated and a conductor bar 22 inserted in the rotor core; a stator 70 having a hollow 70a into which the induction rotor 20 is inserted and installed with a certain length in a direction of the rotational shaft 11; a first magnetic rotor 40 inserted between the stator 70 and the induction rotor 20 and coupled with the rotational shaft 11 so as to be freely rotatable; a second magnetic rotor 50 inserted between the stator 70 and the induction rotor 20 so as to be symmetrical with the first magnetic rotor 40 and coupled with the rotational shaft 11 so as to be freely rotatable; and a magnetic spacer 100 positioned between the first and second magnetic rotors 40 and 50.

Figure 1:
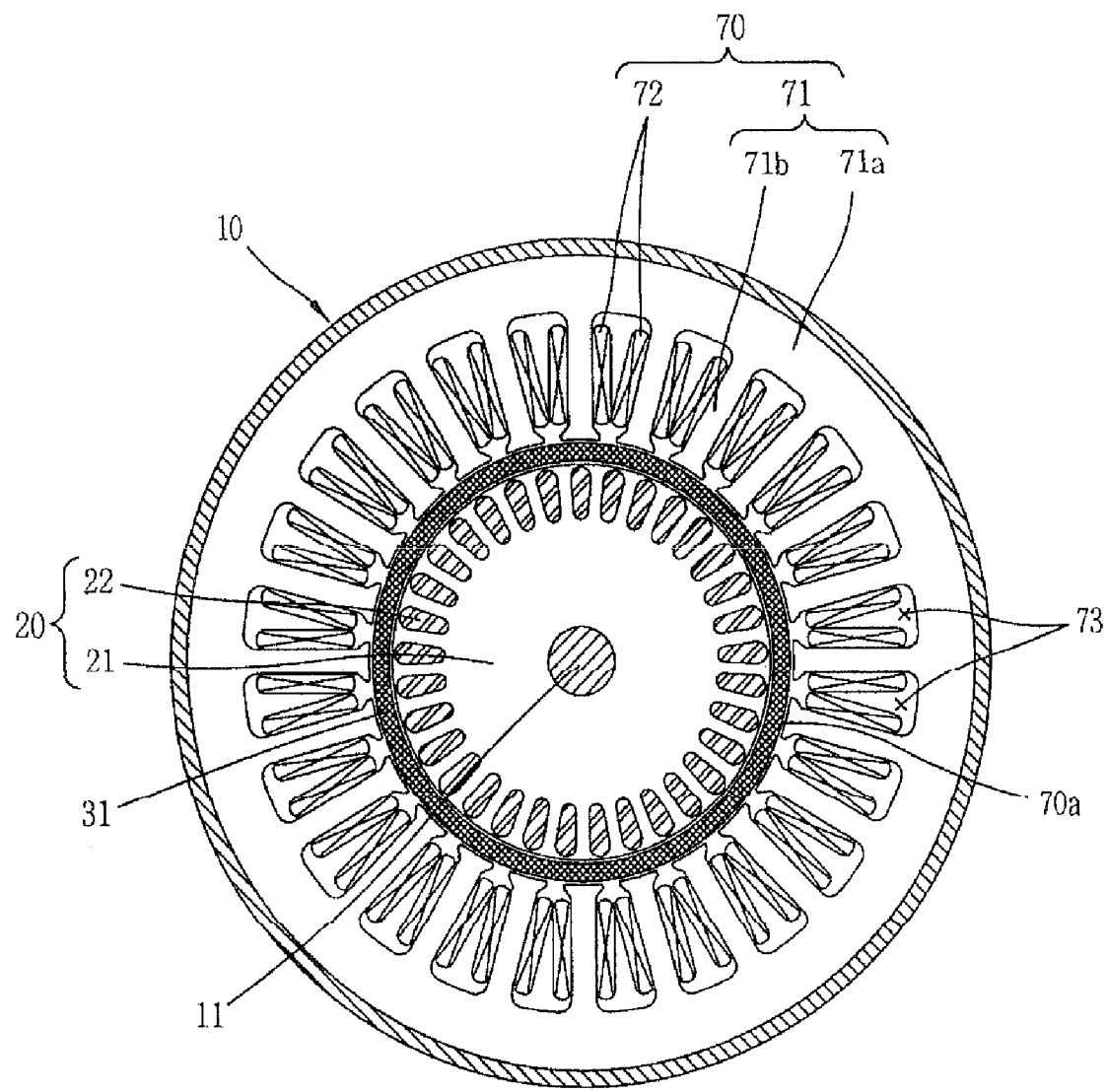
FIG. 1 is a vertical sectional view of a hybrid induction motor studied and developed by the applicant.
Figure 2:
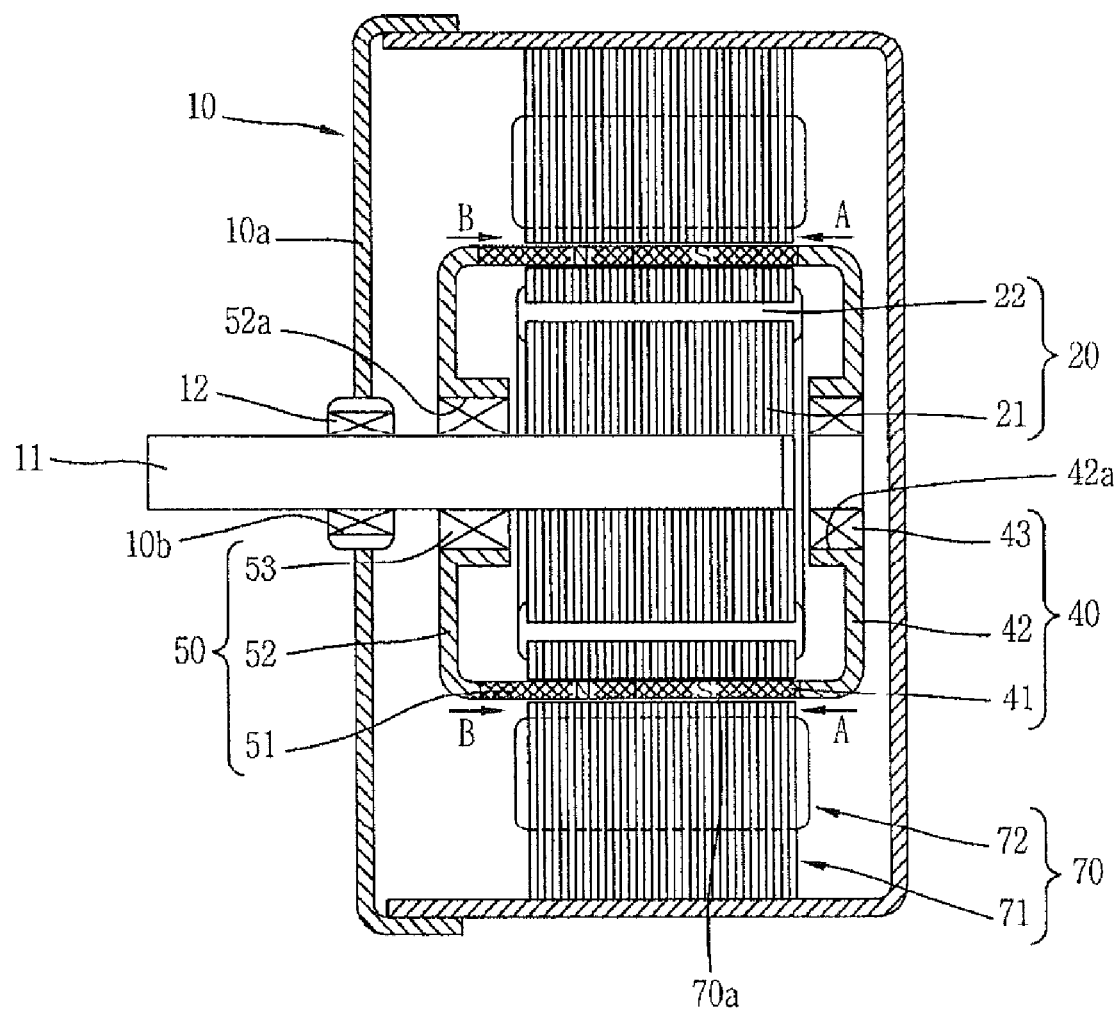
FIG. 2 is a cross-sectional view of the hybrid induction motor showing a state that first and second magnetic rotors of FIG. 1 are attached during their operation.
Figure 3:
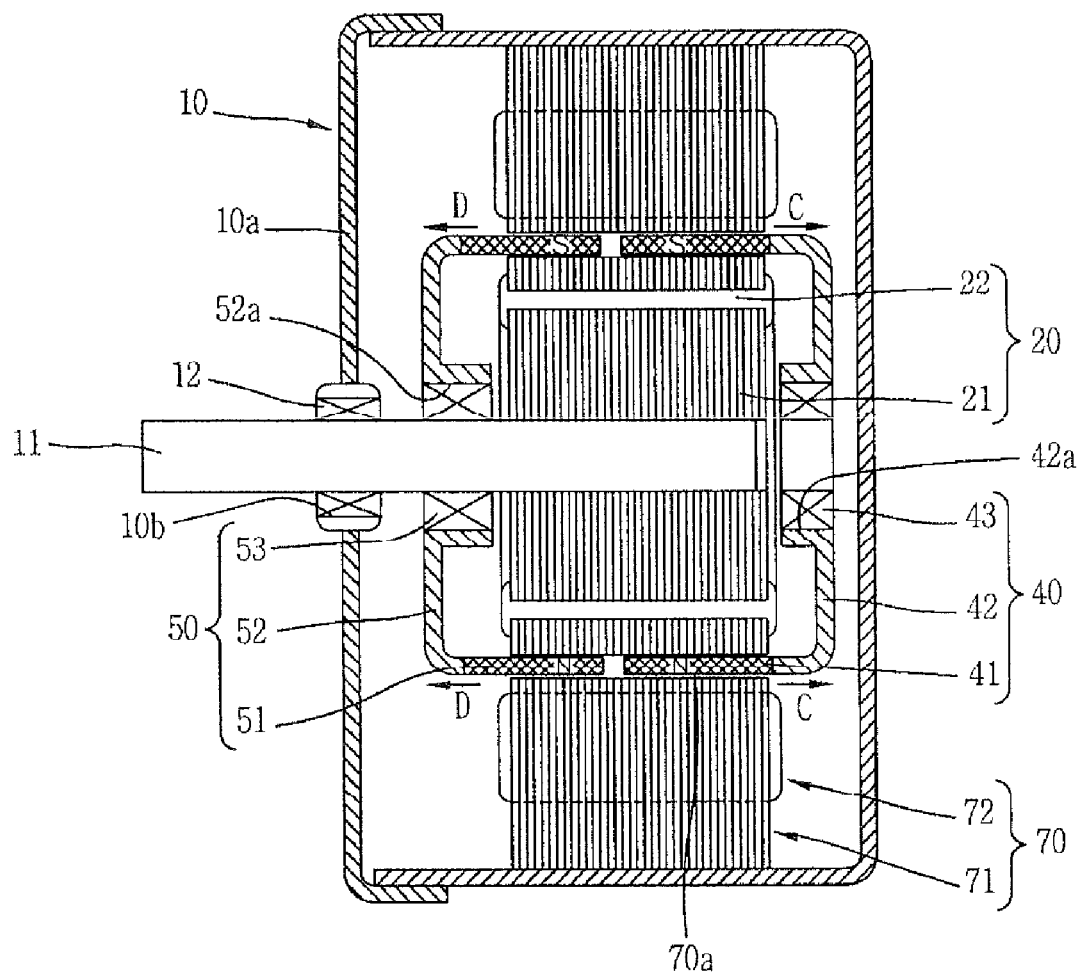
FIG. 3 is a cross-sectional view of the hybrid induction motor showing a state that the first and second magnetic rotors of FIG. 1 are separated during their operation.

The construction and operation of the motor casing 10, the induction rotor 20, the first magnetic rotor 40, the second magnetic rotor 50 and the stator are the same as the hybrid induction motor studied and developed by the applicant of the present invention as shown in FIGS. 1 to 3, so its description will be omitted and the magnetic spacer 100, a core element of the present invention, will be described in detail.

With reference to FIGS. 4 and 5, the magnetic spacer 100 is insertedly positioned between the first and second magnets 41 and 51. For this purpose, the magnetic spacer 100 includes a through hole 101 to allow the induction rotor 20 to penetrate therethrough. The through hole 101 has a larger diameter than that of the induction rotor 20 (refer to FIG. 6) so that the magnetic spacer 100 can be freely rotated on an outer circumferential surface of the induction rotor 20.

Preferably, the magnetic spacer 100 has a thickness (t) of 0 5 to 1 mm to increase adhesion between the first and second magnets 41 and 51 according to results obtained by an experimentation.

The magnetic spacer 100 made of a material of one of iron, nickel and cobalt that can be easily magnetized or made by mixing two or more materials of them. But the present invention is not limited thereto and the magnetic spacer 100 can be made of any other material so long as it can be easily recognized.

The operation of the hybrid induction motor according to an exemplary embodiment of the present invention will be described as follows.

With reference to FIGS. 6 and 7 1 when power is applied to a winding coil 72 of the stator 70, the stator 70 forms a rotating magnetic field. The thusly formed rotating magnetic field makes the first and second magnetic rotors 40 and 50 rotate at a synchronous speed.

When the S pole of the first magnet 41 and the N pole of the second magnet 51 are positioned at a position as shown in FIG. 6 while the motor is being driven, the S pole of the first magnet 41 and the N pole of the second magnet 51 attract each other. Then, the first magnetic rotor 40 moves in the direction of an arrow 'A' and the second magnetic rotor 50 moves in a direction of an arrow 'B', allowing the first and second magnets 41 and 51 to be attached on both sides of the magnetic spacer 100. In this case, because the first and second magnets 41 and 51 are not directly attached but indirectly attached by the medium of the magnetic spacer 100, the distance at which the first and second magnets 41 and 51 are attached is short to reduce vibration and noise generated by their collision, compared with the case where the magnetic spacer 100 is not provided. In addition, because the magnetic spacer 100 serves as a medium therebetween, the adhesion between the first and second magnets 41 and 51 increases, so they cannot hardly separated and thus vibration and noise caused by their separation and attachment can be reduced.

Meanwhile, when the S pole of the first magnet 41 and the S pole of the second magnet 51 are positioned at a position as shown in FIG. 7 while the motor is being driven, the S pole of the first magnet 41 and the S pole of the second magnet 51 repulses each other. Then, the first magnetic rotor 40 moves in a direction of an arrow 'C'0 and the second magnetic rotor 50 moves in a direction of an arrow 'D', so as to be separated. In this case, because the first and second magnets 41 and 51 are not directly attached but indirectly attached by the medium of the magnetic spacer 100, the distance at which the first and second magnets 41 and 51 are separated is short to reduce vibration and noise generated by their separation, compared with the case where the magnetic spacer 100 is not provided. In addition, since the magnetic spacer 100 serves as a medium therebetween, the adhesion between the first and second magnets 41 and 51 increases, while a small degree of separation is maintained between them, and thus vibration and noise caused by their separation and attachment can be reduced.

Meanwhile, when the motor suddenly stops the magnetic spacer 100 can reduce vibration and noise generated as the first and second magnets 41 and 51 are separated or attached. Namely, when power supply to the stator 70 is suddenly stopped because of the failure of the motor, vibration and noise are generated as the first and second magnets 41 and 51 are separate or attached according to their mutual positions.

In this case, because the magnetic spacer 100 is insertedly positioned between the first and second magnets 41 and 51, the vibration and noise caused by the separation and attached between the first and second magnets 41 and 51 can be reduced.

As so far described, the hybrid induction motor according to the exemplary embodiment of the present invention has the advantage that because the magnetic space is positioned between the first and second magnetic rotors, the adhesion between the first and second magnetic rotors increases while a small degree of separation is maintained between the first and second magnetic rotors. Thus, whether the motor is driven or not, vibration and noise caused by their separation and contact between the first and second magnetic rotors can be reduced. Therefore, the operational reliability of the hybrid induction motor can be enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A hybrid induction motor comprising:

a motor casing;

a rotational shaft rotatably coupled with the motor casing;

an induction rotor having a rotor core integrally coupled with the rotational shaft and rotated and a conductor bar inserted in the rotor core;

a stator having a hollow into which the induction rotor is inserted and installed with a certain length in a direction of the rotational shaft;

a first synchronous rotor inserted between the stator and the induction rotor and coupled with the rotational shaft so as to be freely rotatable;

a second synchronous rotor inserted between the stator and the induction rotor so as to be symmetrical with the first synchronous rotor and coupled with the rotational shaft so as to be freely rotatable; and a magnetic spacer inserted between the first and second synchronous rotors.

2. The motor of claim 1, wherein the magnetic spacer has a thickness of 0.5 to 1 mm.

3. The motor of claim 1, wherein the magnetic spacer is made of a material of one of iron, nickel and cobalt that can be easily magnetized or made by mixing two or more materials of iron, nickel or cobalt.

4. A hybrid induction motor comprising:

a motor casing;

a rotational shaft rotatably coupled with the motor casing;

an induction rotor rotated by being integrally coupled with the rotational shaft and having a rotor core at which a plurality of sheets are stacked and a conductor bar penetrating the rotor core so as to be inserted therein;

a stator having a stator core at which a plurality of sheets having a hollow, into which the induction rotor is inserted, are stacked in a direction of the rotational shaft, and main winding and sub-winding wound in a circumferential direction within the stator core;

a first synchronous rotor inserted between the stator and the induction rotor, coupled with the rotational shaft so as to be freely rotatable, and having a first cylindrical magnet with a certain thickness and a first holder formed in a cup shape and supporting the first magnet;

a second synchronous rotor inserted between the stator and the induction rotor so as to be symmetrical with the first synchronous rotor, coupled with the rotational shaft so as to be freely rotatable, and having a second cylindrical magnet installed spaced apart from the first magnet and having a certain thickness and a second holder formed in a cup shape and supporting the second magnet; and a magnetic spacer positioned between the first and second magnets.

5. The motor of claim 4, wherein the magnetic spacer has a thickness of 0.5 to 1 mm.

6. The motor of claim 4, wherein the magnetic spacer is made of a material of one of iron, nickel and cobalt that can be easily magnetized or made by mixing two or more materials of iron, nickel or cobalt.

7. A hybrid induction motor comprising:
a motor casing;
a rotational shaft rotatably coupled with the motor casing;
an induction rotor rotated by being integrally coupled with the rotational shaft and having a rotor core and a conductor bar inserted in the rotor core;
a stator having a hollow into which the induction rotor is inserted and installed with a certain length in a direction of the rotational shaft;
a first synchronous rotor inserted between the stator and the induction rotor and coupled with the rotational shaft so as to be freely rotatable;
a second synchronous rotor inserted between the stator and the induction rotor so as to be symmetrical with the first synchronous rotor and coupled with the rotational shaft so as to be freely rotatable; and
a magnetic spacer inserted between the first and second synchronous rotors, having a thickness of 0.5 to 1 mm, and made of a material of one of iron, nickel and cobalt that can be easily magnetized or made by mixing two or more materials of iron, nickel or cobalt.

* * * * *